US011852823B2

(12) United States Patent
Yoon et al.

(10) Patent No.: US 11,852,823 B2
(45) Date of Patent: Dec. 26, 2023

(54) DEVICE AND METHOD FOR MEASURING DEPTH OF OBJECT

(71) Applicant: SAMSUNG ELECTRONICS CO., LTD., Suwon-si (KR)

(72) Inventors: Sangho Yoon, Suwon-si (KR); Jongchul Choi, Suwon-si (KR); Jaewoo Ko, Suwon-si (KR); Bonkon Koo, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 131 days.

(21) Appl. No.: 17/602,645

(22) PCT Filed: Sep. 24, 2021

(86) PCT No.: PCT/KR2021/013059
§ 371 (c)(1),
(2) Date: Oct. 8, 2021

(87) PCT Pub. No.: WO2022/075642
PCT Pub. Date: Apr. 14, 2022

(65) Prior Publication Data
US 2023/0122125 A1  Apr. 20, 2023

(30) Foreign Application Priority Data
Oct. 8, 2020 (KR) .................. 10-2020-0130460

(51) Int. Cl.
*G02B 27/00* (2006.01)
*G01S 17/894* (2020.01)
(Continued)

(52) U.S. Cl.
CPC .......... *G02B 27/0172* (2013.01); *G01B 11/25* (2013.01); *G01S 17/894* (2020.01); *G06T 19/006* (2013.01); *G06T 2207/10028* (2013.01)

(58) Field of Classification Search
CPC ............... G02B 27/0172; G01B 11/25; G01B 11/2513; G01B 11/22; G01S 17/894;
(Continued)

(56) References Cited

U.S. PATENT DOCUMENTS 8,072,581 B1   12/2011  Breiholz
8,494,252 B2   7/2013   Freedman et al.
(Continued)

FOREIGN PATENT DOCUMENTS

KR  10-2019-0075044 A   6/2019
KR  1020190089627 A     7/2019
KR  10-2019-0118846 A   10/2019

OTHER PUBLICATIONS

Yun-Hsing Fan et al., "Liquid Crystal Microlens Arrays With Switchable Positive and Negative Focal Lengths", IEEE/OSA Journal of Display Technology, vol. 1, No. 1, Sep. 2005, pp. 151-156.
(Continued)

*Primary Examiner* — Jeffery A Brier
(74) *Attorney, Agent, or Firm* — Sughrue Mion, PLLC

(57) ABSTRACT

A method, by an augmented reality device, of measuring a depth of an object includes determining, from a dot-pattern and a surface-pattern, a pattern of light to be emitted for measuring the depth of the object, identifying, from within an entire area of a pattern generator, a partial area of a light source unit corresponding to an area for the determined pattern, emitting light through the area for the determined pattern, by activating the identified partial area of the light source unit, receiving light reflected from the object; and measuring the depth of the object based on the emitted light and the received reflected light.

15 Claims, 17 Drawing Sheets

(51) Int. Cl.
*G01B 11/25* (2006.01)
*G06T 19/00* (2011.01)
*G02B 27/01* (2006.01)

(58) Field of Classification Search
CPC ......... G06T 19/006; G06T 2207/10028; G06T 7/521; G06F 3/011; G06F 3/013; G06F 3/017
See application file for complete search history.

(56) References Cited

U.S. PATENT DOCUMENTS

| | | | |
|---|---|---|---|
| 9,826,216 B1 | 11/2017 | Hazeghi et al. | |
| 10,019,843 B2 | 7/2018 | Grossinger et al. | |
| 10,466,360 B1 * | 11/2019 | Bardagjy | G01S 7/4817 |
| 10,469,722 B2 | 11/2019 | Trail | |
| 10,469,758 B2 | 11/2019 | Price et al. | |
| 10,634,772 B2 | 4/2020 | Eckstein et al. | |
| 10,746,990 B2 | 8/2020 | Park et al. | |
| 10,827,163 B2 | 11/2020 | Trail et al. | |
| 2016/0223724 A1 | 8/2016 | Hudman | |
| 2016/0223828 A1 | 8/2016 | Abraham et al. | |
| 2018/0063390 A1 | 3/2018 | Trail | |
| 2018/0205943 A1 | 7/2018 | Trail | |
| 2019/0066316 A1 | 2/2019 | Bardagjy et al. | |
| 2019/0068853 A1 | 2/2019 | Price et al. | |
| 2019/0227694 A1 | 7/2019 | Shin et al. | |

OTHER PUBLICATIONS

Communications (PCT/ISA/210, PCT/ISA,220, & PCT/ISA/237) dated Dec. 27, 2021 issued by the International Searching Authority in International Application No. PCT/KR2021/013059.

* cited by examiner

DOT PATTERNED LIGHT GENERATION AREA
SURFACE PATTERNED LIGHT GENERATION AREA

DEVICE AND METHOD FOR MEASURING DEPTH OF OBJECT

TECHNICAL FIELD

The disclosure generally relates to a device and method for measuring a depth of an object, and more particularly, to a device and method for measuring a depth of an object by using a plurality of types of patterned light.

BACKGROUND ART

In order to model a three-dimensional space, depth information about a corresponding space is required. In order to identify such depth information, a Time of Flight (ToF) depth camera may be used. Depth cameras may obtain depth information corresponding to a distance between an object in the photographed space and a depth camera.

There is growing interest in spatial augmentation techniques in which three-dimensional-based interactive elements are added to a space, such as augmented reality (AR). The core of spatial augmentation techniques is a three-dimensional space modeling using a depth camera. Using the spatial augmentation techniques, three-dimensionalized reality elements have three-dimensional position information in space and may interact with a virtual object.

In this augmented reality field, weight reduction of a device is important, and accordingly, there is a demand for a technology for reducing device's power consumption when measuring depth information of objects.

DESCRIPTION OF EMBODIMENTS

Technical Problem

Provided are a device and method for measuring a depth of an object by selectively using a plurality of types of patterned light.

Also provided is a device and method for measuring a depth of an object, which are capable of dividing a pattern generator into an area for dot-patterned light and an area for surface-patterned light, and emitting the dot-patterned light and the surface-patterned light by using the divided areas.

Also provided is a device for measuring a depth of an object, which is capable of reducing power consumption of the device by partially activating a light source for emitting patterned light.

Technical Solution to Problem

In accordance with an aspect of the disclosure, there is provided a method, by an augmented reality (AR) device, of measuring a depth of an object includes determining, from a dot-pattern and a surface-pattern, a pattern of light to be emitted for measuring the depth of the object, identifying, from within an entire area of a pattern generator, a partial area of a light source unit corresponding to an area for the determined pattern, emitting light through the area for the determined pattern, by activating the identified partial area of the light source unit, receiving light reflected from the object; and measuring the depth of the object based on the emitted light and the received reflected light.

In accordance with an aspect of the disclosure, there is provided an AR device for measuring a depth of an object. The AR device includes a light source unit configured to irradiate light for depth measurement, a pattern generator configured to change the irradiated light to patterned light, a light receiver configured to receive light reflected from an object in a vicinity of the AR device, a memory storing instructions; and a processor configured to execute the instructions to: determine, from a dot-pattern and a surface-pattern, a pattern of light to be emitted for measuring the depth of the object, identify, from within an entire area of the pattern generator, a partial area of the light source unit corresponding to an area for the determined pattern, emit light through the area for the determined pattern, by activating the identified partial area of the light source unit, receive, through the light receiver, light reflected from the object, and measure the depth of the object based on the emitted light and the received reflected light.

MODE OF DISCLOSURE

Figure 1:
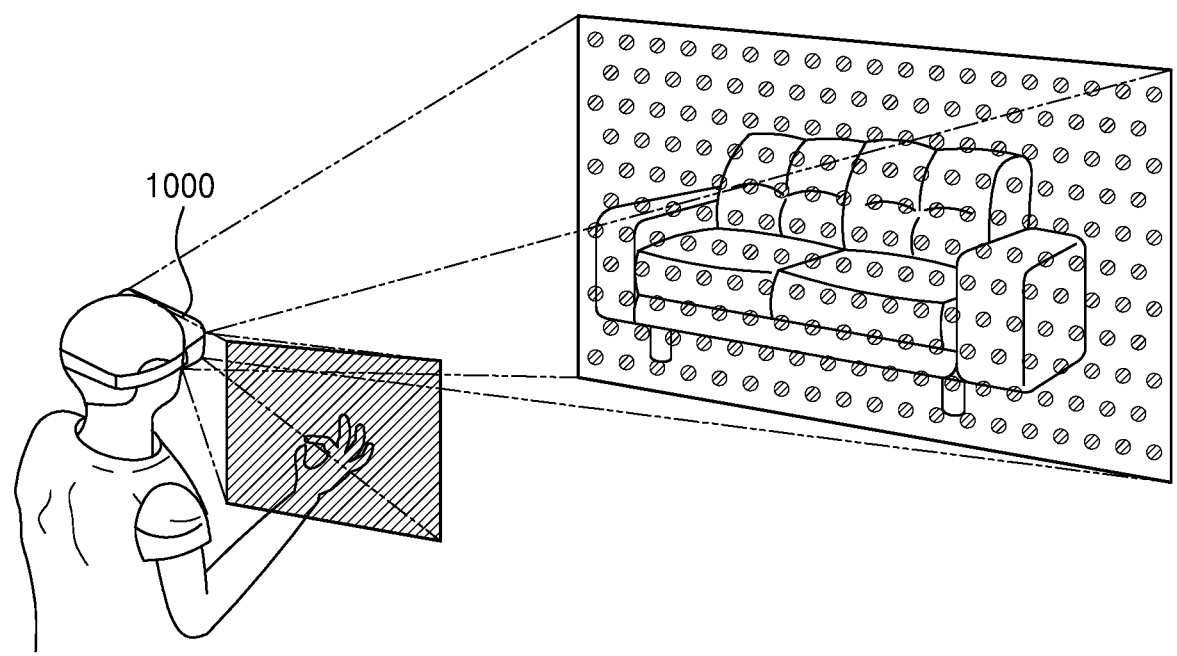
FIG. 1 is a diagram illustrating an example in which an augmented reality (AR) device measures a depth of an object by emitting dot-patterned light and surface-patterned light according to an embodiment.

Throughout the disclosure, the expression "at least one of a, b or c" indicates only a, only b, only c, both a and b, both a and c, both b and c, all of a, b, and c, or variations thereof.

Hereinafter, embodiments of the disclosure will be described in detail with reference to the accompanying drawings for those of ordinary skill in the art to easily implement the embodiments. However, it should be understood that the disclosure is not limited to embodiments described herein and may be embodied in different ways. In addition, portions irrelevant to the description are omitted from the drawings for clarity, and like components are denoted by like reference numerals throughout the specification.

Throughout the specification, when an element is referred to as being "connected to" another element, the element gray be "directly connected to" the other element, or the element may also be "electrically connected to" the other element with an intervening element therebetween. In addition, when an element is referred to as "including" or "comprising" another element, unless otherwise stated, the element may further include or comprise yet another element rather than preclude the yet other element.

In the disclosure, the term augmented reality (AR) may refer to showing a virtual image or both a real world object and a virtual image in a physical environment space of the real world.

Furthermore, the term augmented reality device/AR device may refer to a device that may express AR, and generally includes not only AR glasses in the form of glasses worn on a facial area by a user, but also a head mounted display (HMD) apparatus worn on a head area or an AR helmet.

Meanwhile, the term "real scene" may refer to a scene of the real world that a user sees through the AR device, and may include a real world object. Also, the term "virtual image" may refer to an image generated via an optical engine and may include both a static image and a dynamic image. Such a virtual image is observed along with a real scene, and may be an image representing information about a real world object in the real scene, information about an operation of an AR device, a control menu, or the like.

Thus, general AR devices may include an optical engine for generating a virtual image based on light generated from a light source, and a waveguide which guides the virtual image generated by the optical engine to a user's eyes and is formed of a transparent material so that the user may also see a scene of the real world as well. As described above, the AR devices should be capable of observing a scene of the real world as well, and thus, include an optical element for changing an optical path having straightness basically in order to guide light generated from the optical engine to a user's eyes through the waveguide. In this case, an optical path may be changed using reflection by a mirror or the like, or the optical path may be changed via diffraction by a diffractive element such as a diffractive optical element (DOE), a holographic optical element (HOE), or the like, but the disclosure is not limited thereto.

In the disclosure, an AR device may measure a depth of an object by using a depth sensor. The AR device may emit light toward the object by using an active sensor. The active sensor may include a device that includes a source, emits light from a light source, light, pulse, or the like onto a subject, and receives information reflected from the subject. Unlike a passive sensor, the active sensor includes its own light source and actively emits light from the light source onto a subject, and may measure back scattering of light reflected from the subject to the active sensor. For example, the active sensor may include a ToF sensor for calculating the time taken for a laser or infrared light to return after the laser or the infrared light is emitted onto a subject, a laser sensor, a microwave sensor, a structured light sensor for calculating a distance based on a size or shape of an image on a subject by emitting specific patterned light, and an invertible light sensor.

In the disclosure, a pattern generator is a configuration for changing light irradiated from a light source to patterned light, and may include, for example, a DOE or a liquid crystal (LC) lens array. Light irradiated from a light source to the pattern generator may be changed to patterned light while passing through the pattern generator, and thus, the patterned light may be emitted from the pattern generator. The pattern generator may include a dot-patterned light generation area for changing light irradiated from a light source to dot-patterned light and a surface-patterned light generation area for changing light irradiated from a light source to surface-patterned light.

In the disclosure, surface-patterned light may refer to patterned light emitted toward an entire area including an object, and for example, may be emitted toward an entire area including an object without an area omitted from the area including the object.

Also, dot-patterned light may be patterned light emitted toward a partial area within an area including an object, and may include, for example, pieces of dot-shaped light spaced apart from each other by a certain distance.

Hereinafter, embodiments of the disclosure will be described in detail with reference to the accompanying drawings.

FIG. 1 is a diagram illustrating an example in which an AR device 1000 measures a depth of an object by emitting dot-patterned light and surface-patterned light, according to an embodiment.

The AR device 1000 may measure a depth of an object by emitting patterned light and receiving patterned light reflected from the object in order to measure the depth of the object. The AR device 1000 may emit surface-patterned light to measure a depth of an object located at a short distance from a user. For example, the AR device 1000 emits surface-patterned light to measure a depth of the surroundings of a user's hand located at a short distance therefrom, and thus, may effectively identify a gesture of the user's hand. Also, the AR device 1000 may emit dot-patterned light to measure a depth of an object located at a long distance from a user. For example, the AR device 1000 emits dot-patterned light to measure a depth of the surroundings of a sofa located at a long distance therefrom, and thus, may generate a depth map of the surroundings of the sofa.

The AR device 1000 may divide an entire area of a pattern generator described below into an area for surface-patterned light and an area for dot-patterned light, and may emit the surface-patterned light and the dot-patterned light by selectively utilizing the divided areas. The AR device 1000 may reduce an amount of power consumed to measure depths of objects located at a short distance therefrom and a long distance therefrom, by effectively controlling emission of the surface-patterned light and emission of the dot-patterned light.

Figure 2:
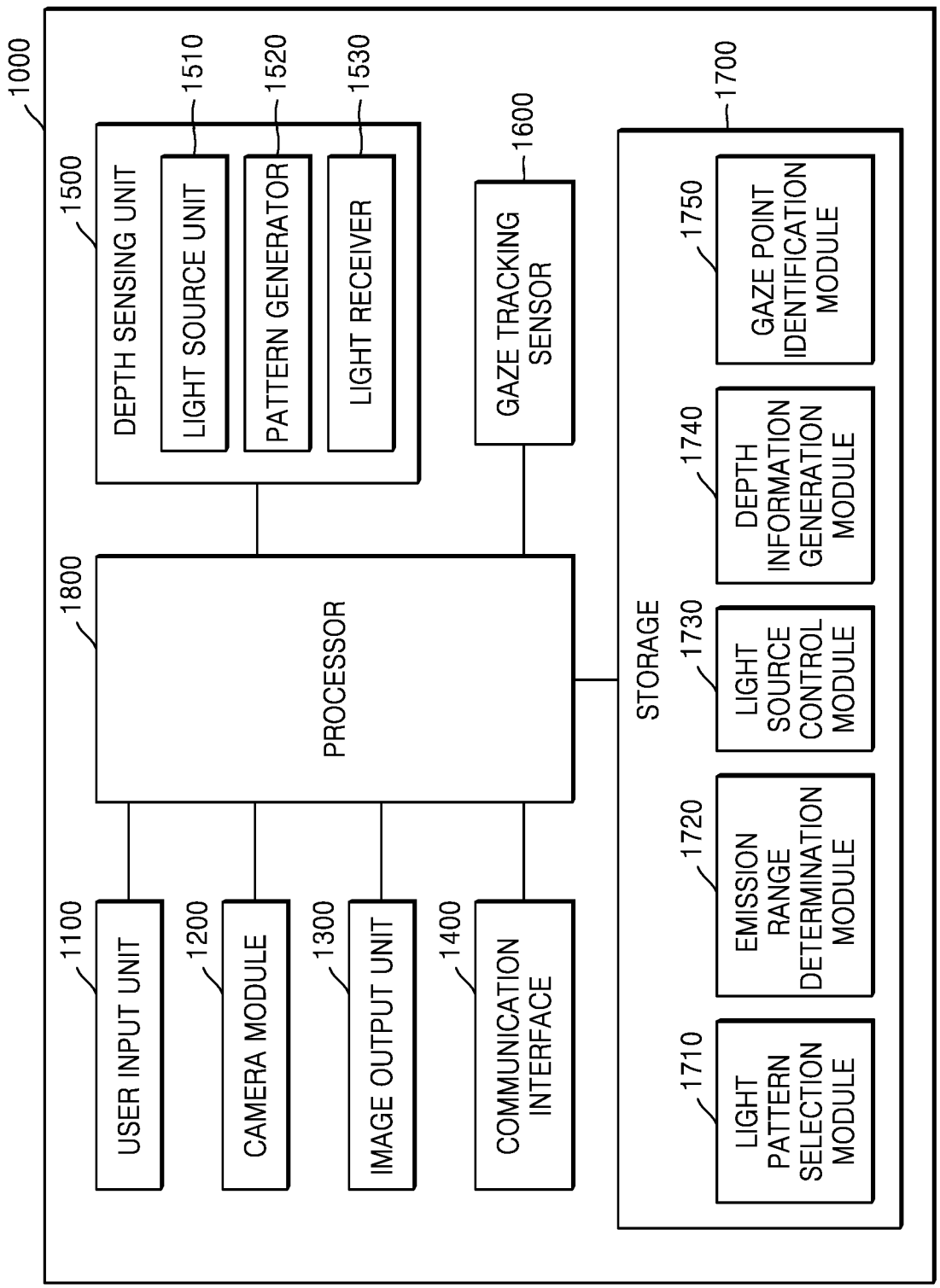
FIG. 2 is a block diagram of an AR device according to an embodiment.

FIG. 2 is a block diagram of the AR device 1000 according to an embodiment.

Referring to FIG. 2, the AR device 1000 may include a user input unit 1100, a camera module 1200, an image output unit 1300, a communication interface 1400, a depth sensing unit 1500, a gaze tracking sensor 1600, a storage 1700, and a processor 1800.

The user input unit 1100 refers to a member for inputting data for a user to control the AR device 1000. For example, the user input unit 1100 may include, but is not limited to, at least one of a keypad, a dome switch, a touch pad (a touch capacitive type, a pressure resistive type, an infrared beam sensing type, a surface acoustic wave type, an integral strain gauge type, a piezoelectric effect type, or the like), a jog wheel, or a jog switch. The user input unit 1100 may receive a user input for measuring a depth of an object. Also, the AR device 1000 may receive an input of a user's voice via a microphone (not shown).

The camera module 1200 may capture an image of surroundings of the AR device 1000. The camera module 1200 may obtain an image frame such as a still image or a moving image through an image sensor when an application that requires a shooting function is executed. An image captured through the image sensor may be processed by the processor 1800 or a separate image processing unit (not shown), The camera module 1200 may include, for example, an RGB camera module, but is not limited thereto. An RGB image captured by the camera module 1200 may be utilized to measure a depth of an object in the vicinity of the AR device 1000.

The image output unit 1300 displays and outputs information processed by the AR device 1000. For example, the image output unit 1300 may output information related to a service provided based on a user interface for measuring a depth of an object in the vicinity of the AR device 1000 and an image obtained by capturing surroundings of the AR device 1000.

According to an embodiment of the disclosure, the image output unit 1300 may provide an AR image. The image output unit 1300 according to an embodiment of the disclosure may include an optical engine and a waveguide. The optical engine may project light of a virtual image to be displayed toward the waveguide. The optical engine may include an RGB light source and an image panel. The RGB light source is an optical component that illuminates light, and may generate light by adjusting the RGB color. The RGB light source may include, for example, a light-emitting diode (LED). The image panel may include a reflective image panel that modulates light illuminated by the RGB light source into light including a two-dimensional image and reflects the light. The reflective image panel may be, for example, a digital micromirror device (DMD) panel or a liquid crystal on silicon (LCoS) panel, or may be or other known reflective image panels.

Also, a virtual image projected from the optical engine onto the waveguide may be reflected in the waveguide according to a total reflection principle. An optical path of the virtual image projected onto the waveguide is changed by a diffraction grating formed in a plurality of areas, and the virtual image may be finally output to a user's eyes. The waveguide may function like a light guide plate that changes an optical path of a virtual image. In an embodiment, because the waveguide is formed of a transparent material, a user may not only see a virtual object of a virtual image totally reflected through the waveguide, but also see an external real scene, and thus, a waveguide may be referred to as a see-through display. The image output unit 1300 may provide an AR image by outputting a virtual image through the waveguide.

The communication interface 1400 may transmit and receive, to and from an external device (not shown) or a server (not shown), data for receiving a service based on an image obtained by capturing an image of surroundings of the AR device 1000.

The depth sensing unit 1500 may be controlled by the processor 1800 described below to measure a depth of an object in the vicinity of the AR device 1000. The depth sensing unit 1500 may include a light source unit 1510, the pattern generator 1520, and a light receiver 1530, and a structure and operation of the depth sensing unit 1500 will be described in detail with reference to FIG. 3.

The gaze tracking sensor 1600 may track gaze of a user wearing the AR device 1000. The gaze tracking sensor 1600 may be installed in a direction toward a user's eyes, and may obtain gaze information related to gaze of the user. The gaze tracking sensor 1600 may include, for example, at least one of an IR scanner or an image sensor, and when the AR device 1000 is a device in the form of glasses, a plurality of gaze tracking sensors may be respectively arranged in the vicinity of a left waveguide and a right waveguide of the AR device 1000 toward a user's eyes.

The gaze tracking sensor 1600 may detect data related to gaze of a user's eyes. The user's gaze information gray be generated based on the data related to the gaze of the user's eyes. The gaze information is information related to gaze of a user, and may include, for example, information about positions of the pupils of the user's eyes, coordinates of central points of the pupils, a direction of the gaze of the user, and the like. The direction of the gaze of the user may be, for example, a gaze direction from the central points of the user's pupils toward a position at which the user gazes. The gaze information generated by the gaze tracking sensor 1600 may be used to identify a position and depth of a point of the gaze of the user.

The storage 1700 may store programs to be executed by the processor 1800 described below, and may store data that is input to or output from the AR device 1000.

The storage 1700 may include at least one of a flash memory type storage medium, a hard disk type storage medium, a multimedia card micro type storage medium, card type memory (for example, secure digital (SD) memory, eXtreme Digital (XD) memory, or the like), random access memory (RAM), static random access memory (SRAM), read-only memory (ROM), electrically erasable programmable read-only memory (EEPROM), programmable read-only memory (PROM), magnetic memory, a magnetic disk, or an optical disk.

The programs stored in the storage 1700 may be classified into a plurality of modules according to their functions, and may include, for example, a light pattern selection module 1710, an emission range determination module 1720, a light source control module 1730, a depth information generation module 1740, and a gaze point identification module 1750.

The processor 1800 controls overall operations of the AR device 1000. For example, by executing the programs stored in the storage 1700, the processor 1800 may generally control the user input unit 1100, the camera module 1200, the image output unit 1300, the communication interlace 1400, the depth sensing unit 1500, the gaze tracking sensor 1600, the storage 1700, and the like.

The processor 1800 may select a type of patterned light to be emitted through the pattern generator 1520 by executing the light pattern selection module 1710 stored in the storage

1700. The processor 1800 may select a pattern of light emitted through the generator 1520. The processor 1800 may determine whether to emit dot-patterned light or surface-patterned light based on a distance between an object for which depth is to be measured and an AR device.

The processor 1800 may determine to emit dot-patterned light when a distance between an AR device and an object where a point of gaze of a user is directed is greater than or equal to a certain threshold value. For example, the processor 1800 may identify a depth of a point of gaze of a user by using the gaze tracking sensor 1600 described below, and determine to emit dot-patterned light when the depth of the point of the gaze of the user is greater than a threshold value. Also, for example, the processor 1800 may identify a depth of a point of gaze of a user by using the gaze tracking sensor 1600 described below, and determine to emit surface-patterned light when the depth of the point of the gaze of the user is less than a threshold value.

Alternatively, for example, the processor 1800 may first measure a depth of a certain area in the vicinity of a position where a point of gaze of a user is directed, and determine to emit dot-patterned light when the measured depth is greater than a threshold value. Alternatively, for example, the processor 1800 may first measure a depth of a certain area in the vicinity of a position where a point of gaze of a user is directed, and determine to emit surface-patterned light when the measured depth is less than a threshold value.

The processor 1800 may determine to emit dot-patterned light when it is necessary to scan the surroundings of the AR device 1000. For example, when the AR device 1000 is powered on, the processor 1800 may determine to emit dot-patterned light in order to generate a depth map for neighboring objects. Also, for example, when a depth of a point of gaze of a user significantly changes to be greater than or equal to a certain threshold value, the processor 1800 may determine to emit dot-patterned light in order to generate a depth map for neighboring objects.

When it is necessary to identify an input of a user's gesture, the processor 1800 may determine to emit surface-patterned light. For example, when a certain gesture action by a user's hand is detected, the processor 1800 may determine to emit surface-patterned light in order to receive an input of a gesture of the user's hand.

The processor 1800 may detect a gesture of a user's hand, determine to emit surface-patterned light onto an area in the vicinity of the user's hand, and determine to emit dot-patterned light onto the remaining area.

The processor 1800 may determine an emission range for emitting patterned light by executing the emission range determination module 1720 stored in the storage 1700.

When it is determined to emit dot-patterned light, the processor 1800 may determine an emission range for emitting the dot-patterned light, and identify a light source corresponding to a dot-patterned light generation area of the pattern generator 1520. The processor 1800 may identify a portion of the light source unit 1510 corresponding to the entire dot-patterned light generation area. When the emission range for emitting the dot-patterned light is a partial area of a real space, the processor 1800 may select a sub-area of the dot-patterned light generation area, and may also select a portion of the light source unit 1510 corresponding to the selected sub-area.

When it is determined to emit surface-patterned light, the processor 1800 may determine an emission range for emitting the surface-patterned light, and identify a light source corresponding to a surface-patterned light generation area of the pattern generator 1520. Also, the processor 1800 may identify a portion of the light source unit 1510 corresponding to the entire surface-patterned light generation area. When the emission range for emitting the surface-patterned light is a partial area of a real space, the processor 1800 may select a sub-area of the surface-patterned light generation area, and may also select a portion of the light source unit 1510 corresponding to the selected sub-area.

The processor 1800 may determine to emit the patterned light only for a partial area within an entire area in the vicinity of the AR device 1000, according to a preset criterion. For example, the processor 1800 may determine the emission range of the patterned light by considering a type of an application being executed and a function of the application. For example, in order to identify the user's gesture, the processor 1800 may determine a partial area in the vicinity of the user's hand as an area onto which the patterned light is to be emitted. However, the disclosure is not limited thereto, and for example, the emission range of the patterned light may be determined according to various criteria such as a remaining battery amount of the AR device 1000, a battery consumption for measuring a depth, and an accuracy of a depth to be measured.

Also, when a point of gaze of a user is identified by the gaze point identification module 1750 described below, the processor 1800 may determine a certain area in the vicinity of the point of the gaze of the user as an area onto which patterned light is to be emitted.

The processor 1800 may allow patterned light to be emitted through at least a portion of the pattern generator 1520 by executing the light source control module 1730 stored in the storage 1700.

The processor 1800 may determine through which area of the pattern generator 1520 the patterned light should be emitted based on the type of the patterned light and the emission range of the patterned light. The processor 1800 may determine a pattern of the light to be emitted and emission range of the light to be emitted, and may determine through which area of the pattern generator 1520 the light should be emitted. Also, the processor 1800 may activate a partial area of the light source unit 1510 corresponding to a partial area of the pattern generator 1520, so that patterned light is emitted through the partial area of the pattern generator 1520.

The processor 1800 may activate a portion of the light source unit 1510 corresponding to a dot-patterned light generation area, so that light irradiated from the portion of the light source unit 1510 may be emitted through the dot-patterned light generation area of the pattern generator 1520. The light emitted through the dot-patterned light generation area may be dot-patterned light. Also, the processor 1800 may receive the dot-patterned light reflected from an object. The dot-patterned light emitted from the dot-patterned light generation area may be reflected from the object, and the light receiver 1530 of the AR device 1000 may receive the reflected dot-patterned light.

The processor 1800 may activate a portion of the light source unit 1510 corresponding to a surface-patterned light generation area, so that light irradiated from the portion of the light source unit 1510 may be emitted through the surface-patterned light generation area of the pattern generator 1520. The light emitted through the surface-patterned light generation area may be surface-patterned light. Also, the processor 1800 may receive the surface-patterned light reflected from an object. The surface-patterned light emitted from the surface-patterned light generation area may be reflected from the object, and the light receiver 1530 of the AR device 1000 may receive the reflected surface-patterned light.

Meanwhile, the processor 1800 may control the light source unit 1510 so that surface-patterned light and dot-patterned light are sequentially emitted in order to scan the surroundings of the AR device 1000. In this case, the processor 1800 may repeat an operation of activating a portion of the light source unit 1510 corresponding to a dot-patterned light generation area of the pattern generator 1520 to emit dot-patterned light, and then, activating a portion of the light source unit 1510 corresponding to a surface-patterned light generation area of the pattern generator 1520 to emit surface-patterned light. Also, the processor 1800 may determine whether to terminate scanning of surroundings of the AR device 1000 based on a result of measuring a depth by the depth information generation module 1740 described below. When it is determined that a depth map is sufficiently generated, the processor 1800 may terminate scanning of the surroundings of the AR device 1000.

The processor 1800 may measure a depth of an object by executing the depth information generation module 1740 stored in the storage 1700. The processor 1800 may measure a depth of an object based on emitted dot-patterned light and reflected dot-patterned light. For example, the processor 1800 may calculate a depth of an object based on a time when dot-patterned light is emitted, a time when the reflected dot-patterned light is received, a pattern of the emitted dot-patterned light, and a pattern of the received dot-patterned light. Also, the processor 1800 may generate a depth map of the surroundings of the AR device 1000 based on the calculated depth of the object.

The processor 1800 may measure a depth of an object based on emitted surface-patterned light and reflected surface-patterned light. The processor 1800 may calculate a depth of an object based on a time when surface-patterned light is emitted, a time when the reflected surface-patterned light is received, a pattern of the emitted surface-patterned light, and a pattern of the received surface-patterned light. Also, the processor 1800 may identify a user's gesture based on the calculated depth of the object.

The processor 1800 may control the gaze tracking sensor 1600 and identify a point of gaze of a user, by executing the gaze point identification module 1750 stored in the storage 1700. The processor 1800 may measure a depth of the point of the gaze of the user. For example, the processor 1800 may calculate a depth of a point of gaze at which a user gazes based on positions of the user's pupils. Alternatively, for example, the processor 1800 may also measure a depth of an object located at a point of gaze of a user by using the depth sensing unit 1500. In this case, the processor 1800 may irradiate light toward the object located at the point of the gaze of the user, and measure a depth of the point of the gaze by using the light reflected from the object.

Also, the processor 1800 may identify a point of gaze of a user via the gaze tracking sensor 1600, and determine whether a change in a depth of the identified point of the gaze is greater than a certain threshold value. The processor 1800 may monitor a change of a depth of a point of gaze of a user, and determine whether a change in the depth of the point of the gaze of the user is greater than a certain threshold value. Also, the processor 1800 may determine whether to scan the surroundings of the AR device 1000, according to the change in the depth of the point of the gaze of the user.

Figure 3:
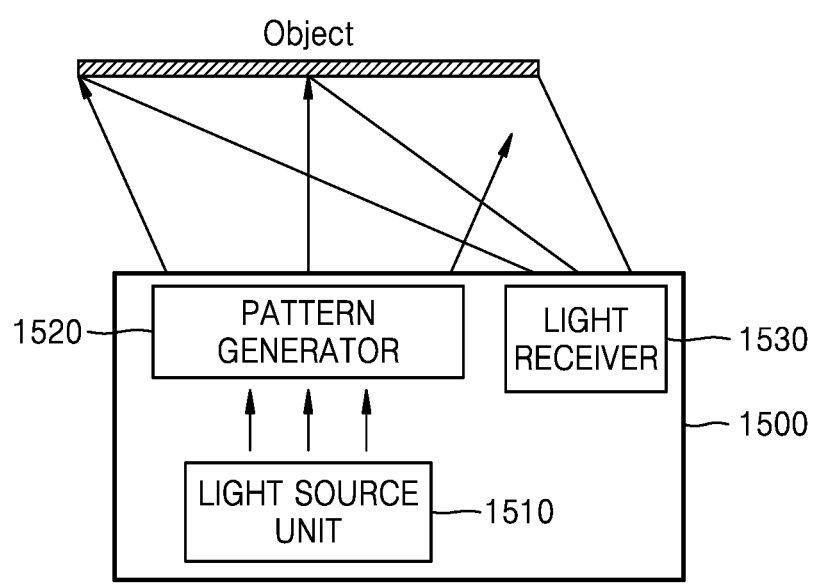
FIG. 3 is a block diagram of a depth sensing unit according to an embodiment.

FIG. 3 is a block diagram of the depth sensing unit 1500 according to an embodiment.

Referring to FIG. 3, the depth sensing unit 1500 may include the light source unit 1510, the pattern generator 1520, and the light receiver 1530.

The light source unit 1510 may include a plurality of light source elements, and may irradiate light toward at least a portion of the pattern generator 1520. For example, the light source unit 1510 may include a plurality of arranged laser light emitting elements, and the light source unit 1510 is positioned at a lower end of the pattern generator 1520 described below and may irradiate laser light toward the pattern generator 1520.

The pattern generator 1520 may generate a pattern of light irradiated from the light source unit 1510. Patterned light may be emitted from the pattern generator 1520 while the light irradiated from the light source unit 1510 passes through the pattern generator 1520.

The pattern generator 1520 may include a dot-patterned light generation area for changing light irradiated from the light source unit 1510 to dot-patterned light and a surface-patterned light generation area for changing light irradiated from the light source unit 1510 to surface-patterned light. Also, the dot-patterned light generation area and the surface-patterned light generation area may each be divided into a plurality of sub-areas.

The pattern generator 1520 may include, for example, a DOE, or may include an LC lens array. When the pattern generator 1520 includes a DOE, the pattern generator 1520 may be manufactured to include a dot-patterned light generation area and a surface-patterned light generation area. Alternatively, when the pattern generator 1520 includes an LC lens array, a certain control voltage is applied to the pattern generator 1520 by the processor 1800, the arrangement of liquid crystal molecules in the pattern generator 1520 is changed, and thus, a dot-patterned light generation area and a surface-patterned light generation area may be flexibly formed in the pattern generator 1520.

When patterned light emitted from the pattern generator 1520 is reflected from an object, the light receiver 1530 may receive the reflected patterned light.

Figure 4A:
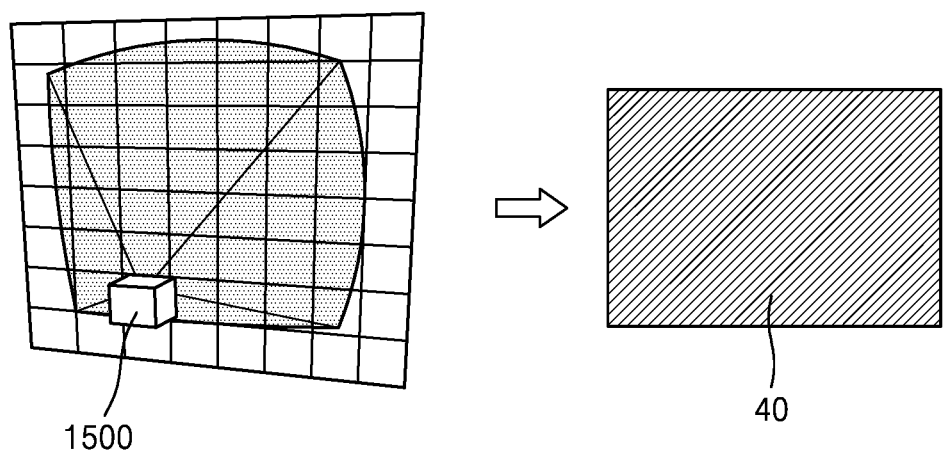
FIG. 4A is a diagram illustrating an example of surface-patterned light according to an embodiment.

FIG. 4A is a diagram illustrating an example of surface-patterned light according to an embodiment.

Referring to FIG. 4A, surface-patterned light may be emitted from the depth sensing unit 1500. Surface-patterned light 40 is patterned light emitted toward an entire area including an object, and for example, may be emitted toward an entire area including an object without an area omitted from the area including the object.

Figure 4B:
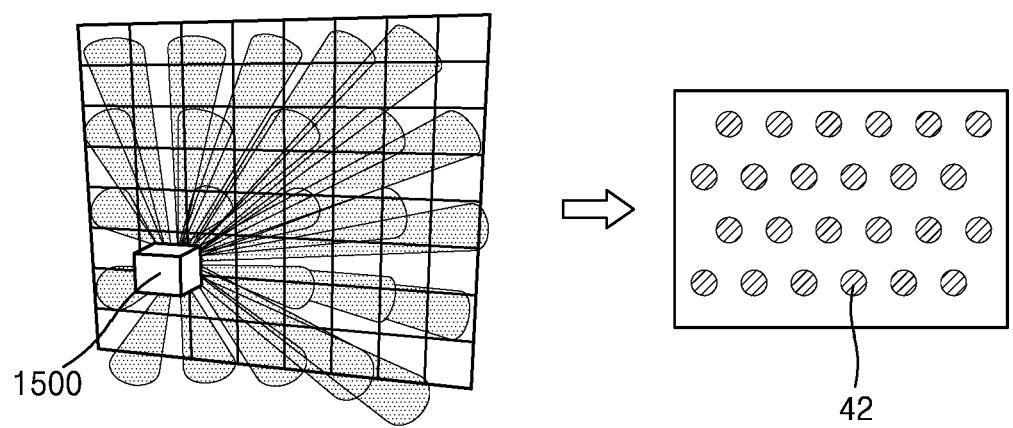
FIG. 4B is a diagram illustrating an example of dot-patterned light according to an embodiment.

FIG. 4B is a diagram illustrating an example of dot-patterned light according to an embodiment.

Referring to FIG. 4B, dot-patterned light may be emitted from the depth sensing unit 1500. Dot-patterned light 42 is patterned light emitted toward a partial area within an area including an object, and may include, for example, pieces of dot-shaped light spaced apart from each other by a certain distance.

Figure 5A:
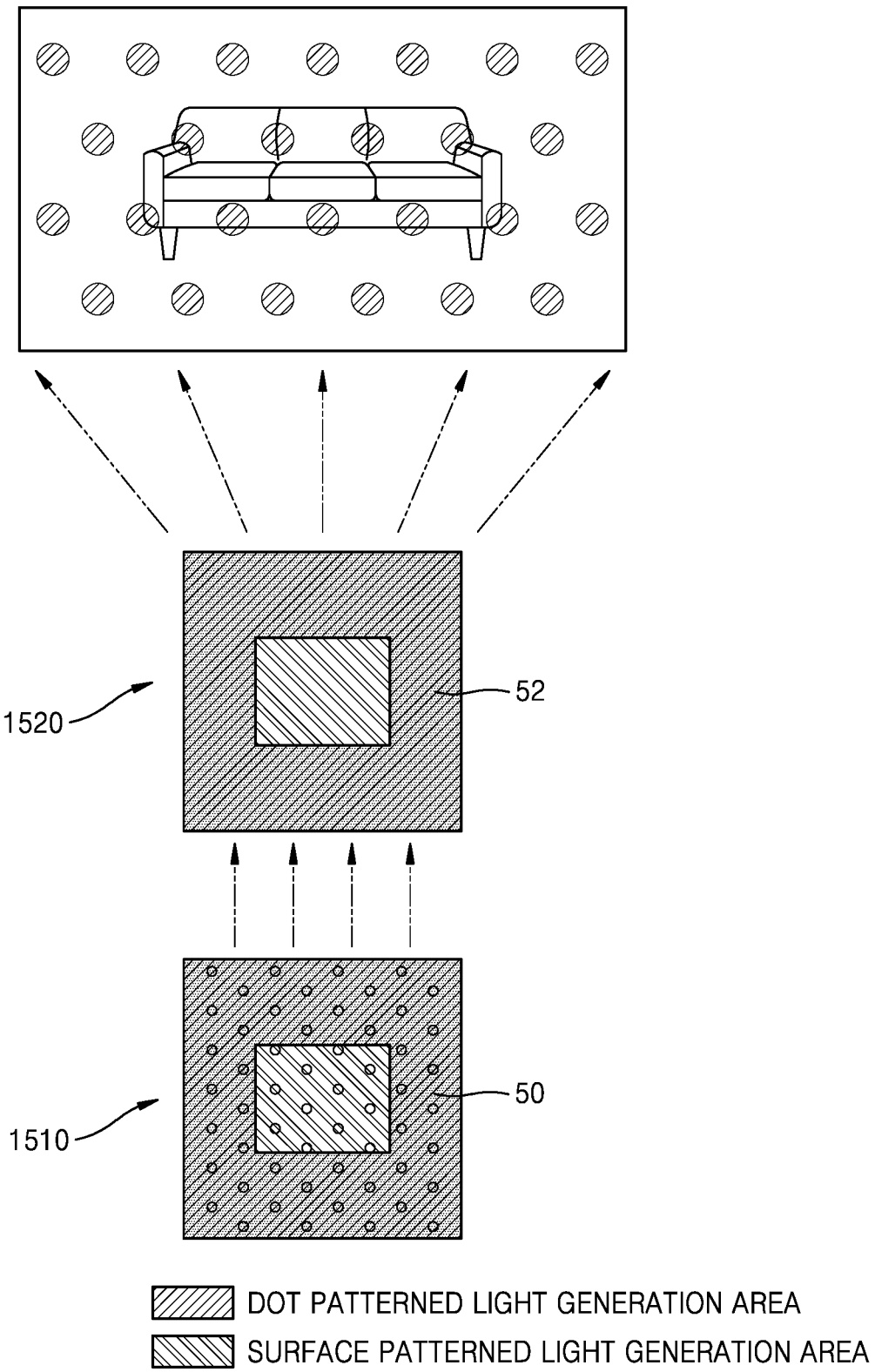
FIG. 5A is a diagram illustrating an example in which light irradiated from a light source unit is changed to dot-patterned light by a pattern generator according to an embodiment.

FIG. 5A is a diagram illustrating an example in which light irradiated from the light source unit 1510 is changed to dot-patterned light by the pattern generator 1520 according to an embodiment.

Referring to FIG. 5A, while light irradiated from a partial area 50 of the light source unit 1510 passes through a dot-patterned light generation area 52 of the pattern generator 1520, dot-patterned light may be emitted toward a real space.

Figure 5B:
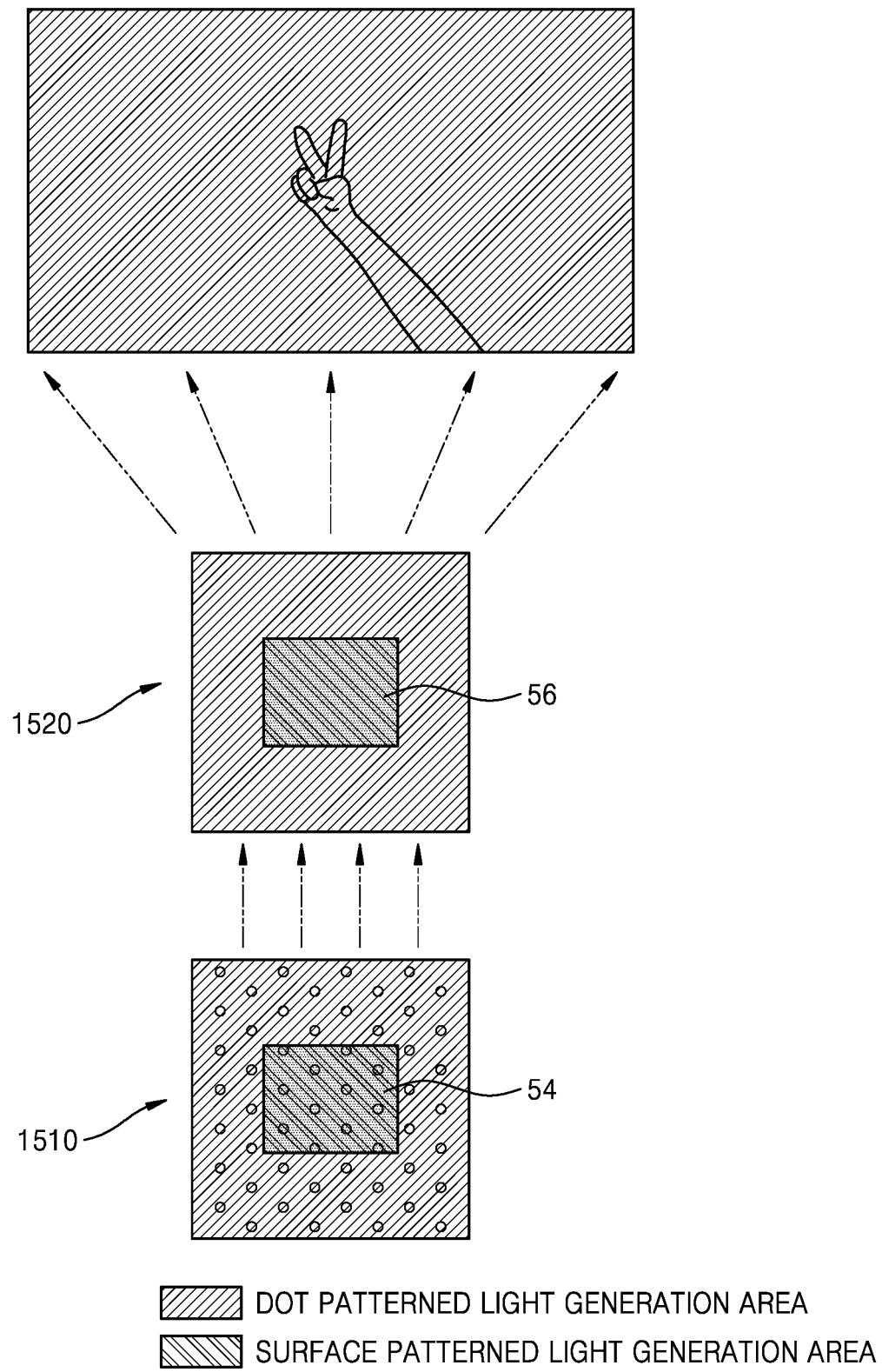
FIG. 5B is a diagram illustrating an example in which light irradiated from a light source unit is changed to surface-patterned light by a pattern generator according to an embodiment.

FIG. 5B is a diagram illustrating an example in which light irradiated from the light source unit 1510 is changed to surface-patterned light by the pattern generator 1520 according to an embodiment.

Referring to FIG. 5B, while light irradiated from a partial area 54 of the light source unit 1510 passes through a surface-patterned light generation area 56 of the pattern generator 1520, surface-patterned light may be emitted toward a real space.

Figure 6:
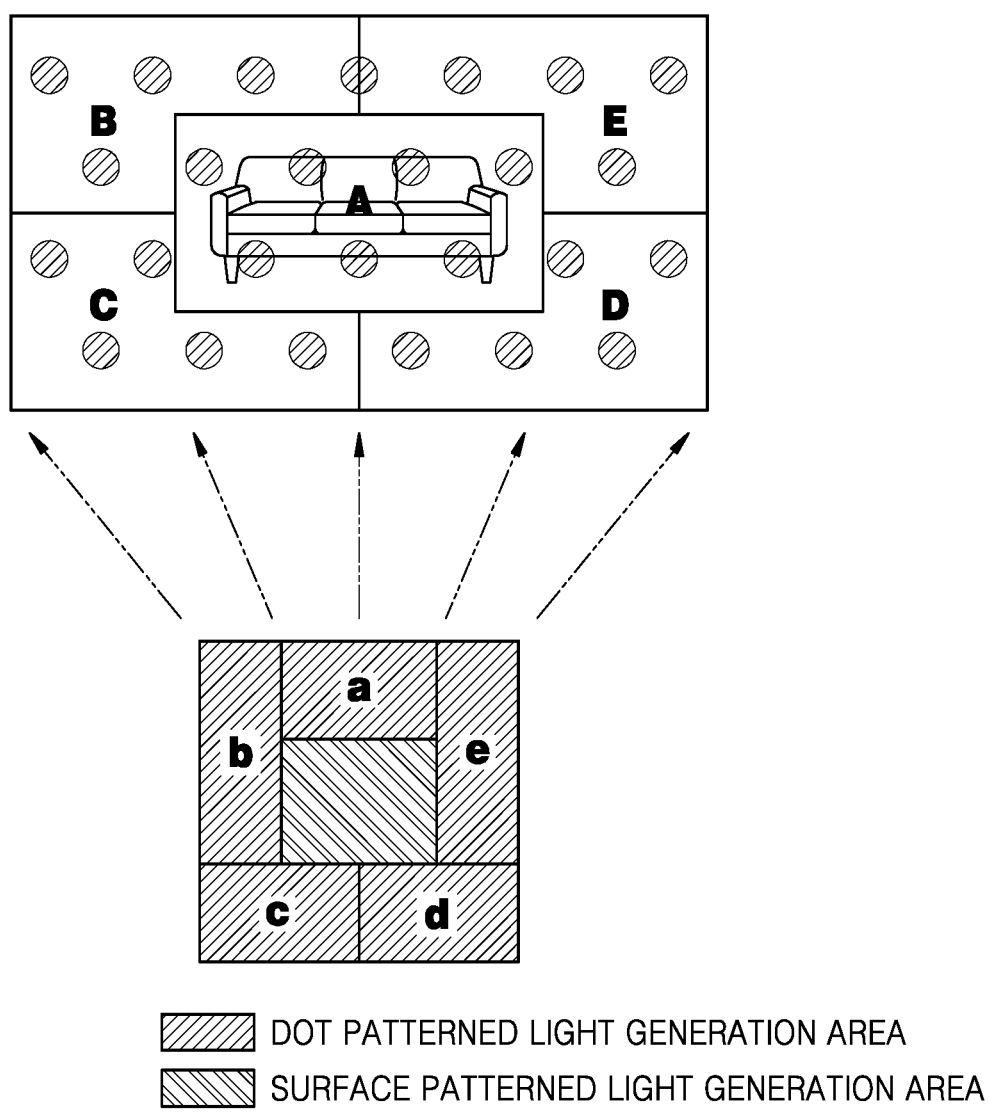
FIG. 6 is a diagram illustrating a matching relationship between sub-areas of a pattern generator and areas of a real space according to an embodiment.

FIG. 6 is a diagram illustrating a matching relationship between sub-areas of the pattern generator 1520 and areas of a real space according to an embodiment.

Referring to FIG. 6, a dot-patterned light generation area for dot-patterned light in the pattern generator 1520 may be divided into a sub-area a, a sub-area b, a sub-area c, a sub-area d, and a sub-area e. Also, the sub-area a of the pattern generator 1520 may correspond to an area A of the real space, the sub-area b of the pattern generator 1520 may correspond to an area B of the real space, the sub-area c of the pattern generator 1520 may correspond to an area C of the real space, the sub-area d of the pattern generator 1520 may correspond to an area D of the real space, and the sub-area e of the pattern generator 1520 may correspond to an area E of the real space.

Thus, dot-patterned light may be emitted toward the area A of the real space while light irradiated from the light source unit 1510 passes through the sub-area a, dot-patterned light may be emitted toward the area B of the real space while the light irradiated from the light source unit 1510 passes through the sub-area b, dot-patterned light may be emitted toward the area C of the real space while the light irradiated from the light source unit 1510 passes through the sub-area c, dot-patterned light may be emitted toward the area D of the real space while the light irradiated from the light source unit 1510 passes through the sub-area d, and dot-patterned light may be emitted toward the area E of the real space while the light irradiated from the light source unit 1510 passes through the sub-area e.

Figure 7A:
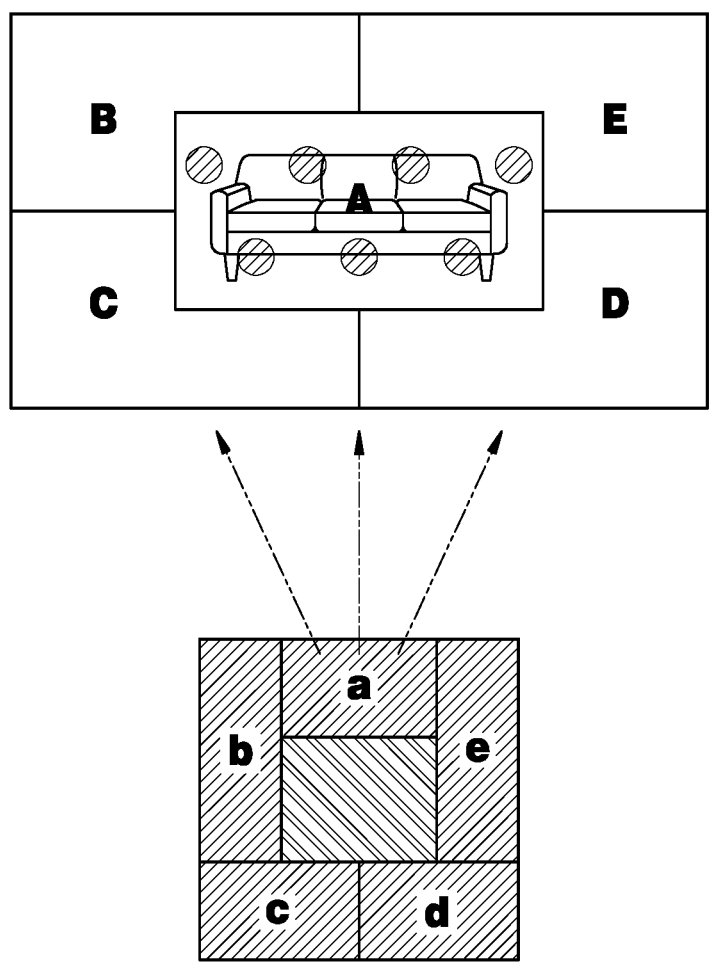
FIG. 7A is a diagram illustrating an example of emitting dot-patterned light through one sub-area among sub-areas of a pattern generator according to a position of an object, according to an embodiment.

FIG. 7A is a diagram illustrating an example of emitting dot-patterned light through one sub-area among the sub-areas of the pattern generator 1520 according to a position of an object, according to an embodiment.

Referring to FIG. 7A, when the object for which depth is to be measured is included in the area A of the real space, the AR device 1000 may emit dot-patterned light only through the sub-area a among the sub-areas of the pattern generator 1520.

In this case, the AR device 1000 activates a partial area of the light source unit 1510 corresponding to the sub-area a of the pattern generator 1520, and light irradiated from the activated partial area passes through the sub-area a of the pattern generator 1520, and thus, the dot-patterned light may be emitted from the sub-area a of the pattern generator 1520 toward the area A of the real space. Also, the dot-patterned light emitted toward the area A of the real space is reflected from the object, and the reflected dot-patterned light is received by the light receiver 1530, and thus, the AR device 1000 may measure the depth of the object.

Figure 7B:
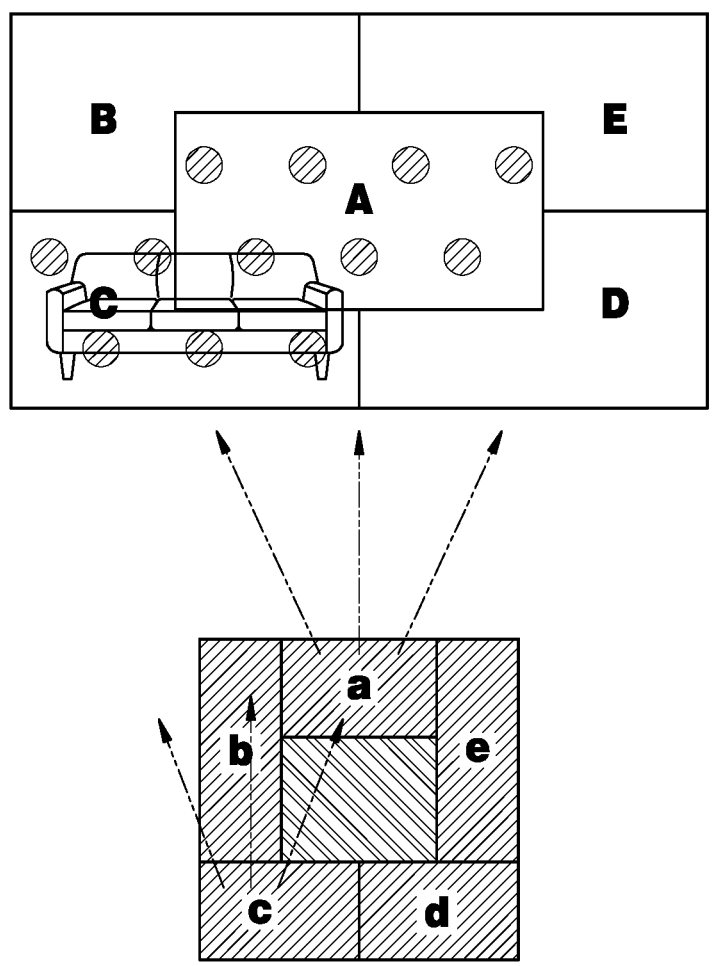
FIG. 7B is a diagram illustrating an example of emitting dot-patterned light through two sub-areas among sub-areas of a pattern generator according to a position of an object, according to an embodiment.

FIG. 7B is a diagram illustrating an example of emitting dot-patterned light through two sub-areas among the sub-areas of the pattern generator 1520 according to a position of an object, according to an embodiment.

Referring to FIG. 7B, when the object for which depth is to be measured is included in the areas A and C of the real space, the AR device 1000 may emit dot-patterned light only through the sub-areas a and c among the sub-areas of the pattern generator 1520.

In this case, the AR device 1000 activates partial areas of the light source unit 1510 corresponding to the sub-areas a and c of the pattern generator 1520, and light irradiated from the activated partial areas passes through the sub-areas a and c of the pattern generator 1520, and thus, the dot-patterned light may be emitted from the sub-areas a and c of the pattern generator 1520 toward the areas A and C of the real space.

Also, the dot-patterned light emitted toward the areas A and C of the real space is reflected from the object, and the reflected dot-patterned light is received by the light receiver 1530, and thus, the AR device 1000 may measure the depth of the object.

The AR device 1000 may emit dot-patterned light only with respect to a partial area of a real space in which an object is located, and thus, an amount of power consumed by the AR device 1000 to measure a depth of the object may be reduced.

Figure 8:
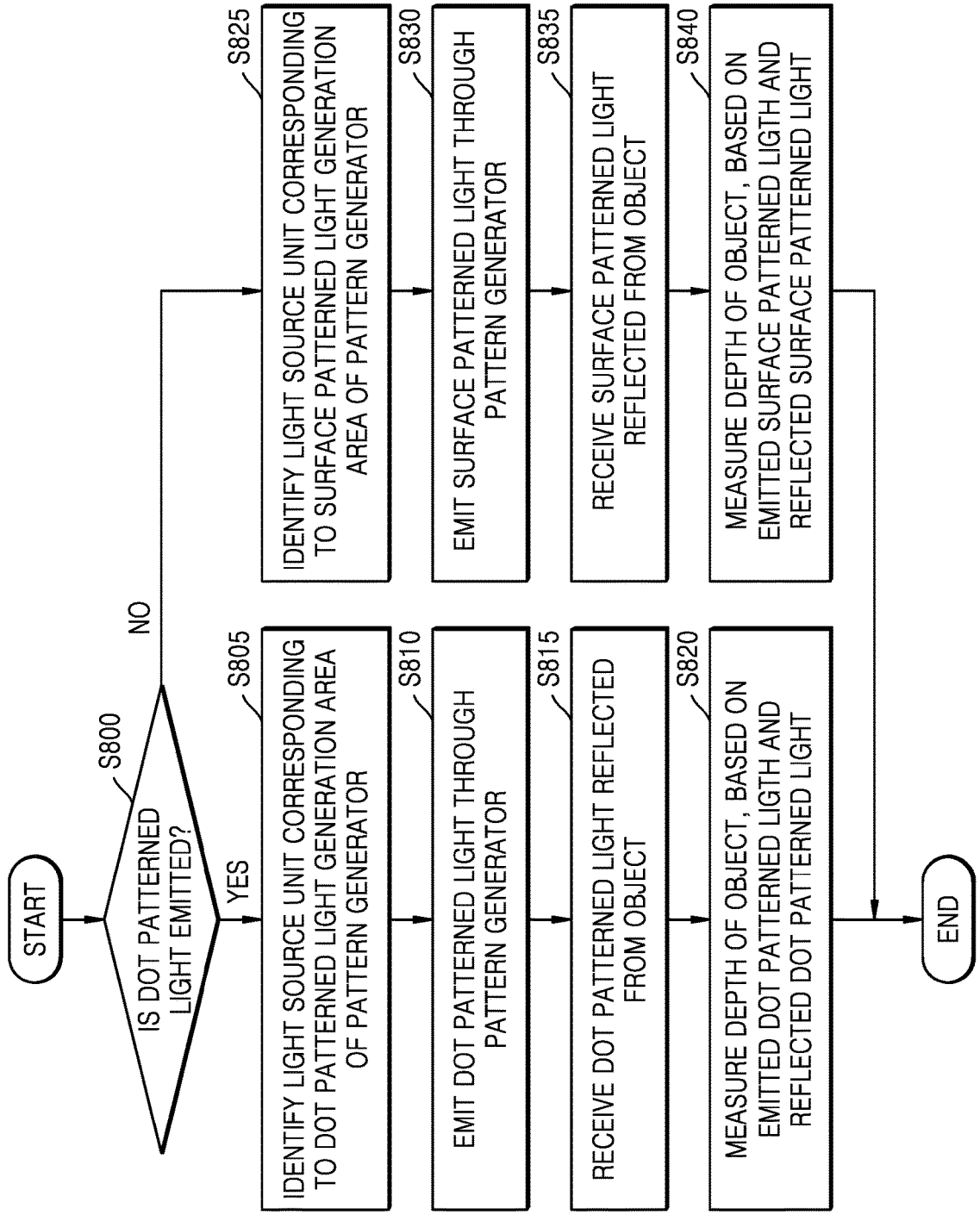
FIG. 8 is a flowchart of a method, performed by an AR device, for selectively emitting dot-patterned light and surface-patterned light according to an embodiment.

FIG. 8 is a flowchart of a method, performed by the AR device 1000, for selectively emitting dot-patterned light and surface-patterned light, according to an embodiment.

In operation S800, the AR device 1000 may determine whether to emit dot-patterned light. The AR device 1000 may determine whether to emit dot-patterned light or surface-patterned light based on a distance between an object for which depth is to be measured and the AR device 1000.

The AR device 1000 according to an embodiment of the disclosure may determine to emit dot-patterned light when a distance between the AR device 1000 and an object where a point of gaze of a user is directed is greater than or equal to a certain threshold value. For example, the AR device 1000 may identify a depth of a point of gaze of a user by using the gaze tracking sensor 1600, and determine to emit dot-patterned light when the depth of the point of the gaze of the user is greater than a threshold value. Also, for example, the AR device 1000 may identify a depth of a point of gaze of a user by using the gaze tracking sensor 1600, and determine to emit surface-patterned light when the depth of the point of gaze of the user is less than a threshold value.

Alternatively, for example, the AR device 1000 may first measure a depth of a certain area in the vicinity of a position where a point of gaze of a user is directed, and determine to emit dot-patterned light when the measured depth is greater than a threshold value. Also, for example, the AR device 1000 may first measure a depth of a certain area in the vicinity of a position where a point of gaze of a user is directed, and determine to emit surface-patterned light when the measured depth is less than a threshold value.

The AR device 1000 according to an embodiment of the disclosure may determine to emit dot-patterned light when it is necessary to scan the surroundings of the AR device 1000. For example, when the AR device 1000 is powered on, the AR device 1000 may determine to emit dot-patterned light in order to generate a depth map for neighboring objects. Also, for example, when a depth of a point of gaze of a user significantly changes to be greater than or equal to a certain threshold value, the AR device 1000 may determine to emit dot-patterned light in order to generate a depth map for neighboring objects.

When it is necessary to identify an input of a user's gesture, the AR device 1000 according to an embodiment of the disclosure may determine to emit surface-patterned light. For example, when a certain gesture action by a user's hand is detected, the AR device 1000 may determine to emit surface-patterned light in order to receive an input of a gesture of the user's hand.

When it is determined to emit the dot-patterned light in operation S800, the AR device 1000 may identify the light source unit 1510 corresponding to a dot-patterned light generation area of the pattern generator 1520 in operation S805. The pattern generator 1520 may include a dot-patterned light generation area for generating dot-patterned light and a surface-patterned light generation area for generating surface-patterned light. Also, the AR device 1000 may identify a portion of the light source unit 1510 corresponding to the dot-patterned light generation area. The portion of the light source unit 1510 corresponding to the dot-patterned light generation area may be a portion that irradiates light from the light source unit 1510 to the dot-patterned light generation area.

The AR device 1000 may emit dot-patterned light through the pattern generator 1520 in operation S810. The AR device 1000 may activate a portion of the light source unit 1510 corresponding to the dot-patterned light generation area, so that light irradiated from the portion of the light source unit 1510 may be emitted through the dot-patterned light generation area of the pattern generator 1520. The light emitted through the dot-patterned light generation area may be dot-patterned light.

In operation S815, the AR device 1000 may receive dot-patterned light reflected from an object. The dot-patterned light emitted from the dot-patterned light generation area may be reflected from the object, and the light receiver 1530 of the AR device 1000 may receive the reflected dot-patterned light.

In operation S820, the AR device 1000 may measure a depth of the object based on the emitted dot-patterned light and the reflected dot-patterned light. The AR device 1000 may calculate the depth of the object based on a time when the dot-patterned light is emitted, a time when the reflected dot-patterned light is received, and a difference between a pattern of the emitted dot-patterned light and a pattern of the received dot-patterned light.

When it is determined not to emit the dot-patterned light in operation S800, the AR device 1000 may identify the light source unit 1510 corresponding to the dot-patterned light generation area of the pattern generator 1520 in operation S825. Also, the AR device 1000 may identify a portion of the light source unit 1510 corresponding to the surface-patterned light generation area. The portion of the light source unit 1510 corresponding to the surface-patterned light generation area may be a portion that irradiates light from the light source unit 1510 to the surface-patterned light generation area.

In operation S830, the AR device 1000 may emit surface-patterned light through the pattern generator 1520. The AR device 1000 may activate a portion of the light source unit 1510 corresponding to the surface-patterned light generation area, so that light irradiated from the portion of the light source unit 1510 may be emitted through the surface-patterned light generation area of the pattern generator 1520. The light emitted through the surface-patterned light generation area may be surface-patterned light.

In operation S835, the AR device 1000 may receive surface-patterned light reflected from an object. The surface-patterned light emitted from the surface-patterned light generation area may be reflected from the object, and the light receiver 1530 of the AR device 1000 may receive the reflected surface-patterned light.

In operation S840, a depth of the object may be measured based on the emitted surface-patterned light and the reflected surface-patterned light. The AR device 1000 may calculate the depth of the object based on a time when the surface-patterned light is emitted, a time when the reflected surface-patterned light is received, and a difference between a pattern of the emitted surface-patterned light and a pattern of the received surface-patterned light.

Figure 9:
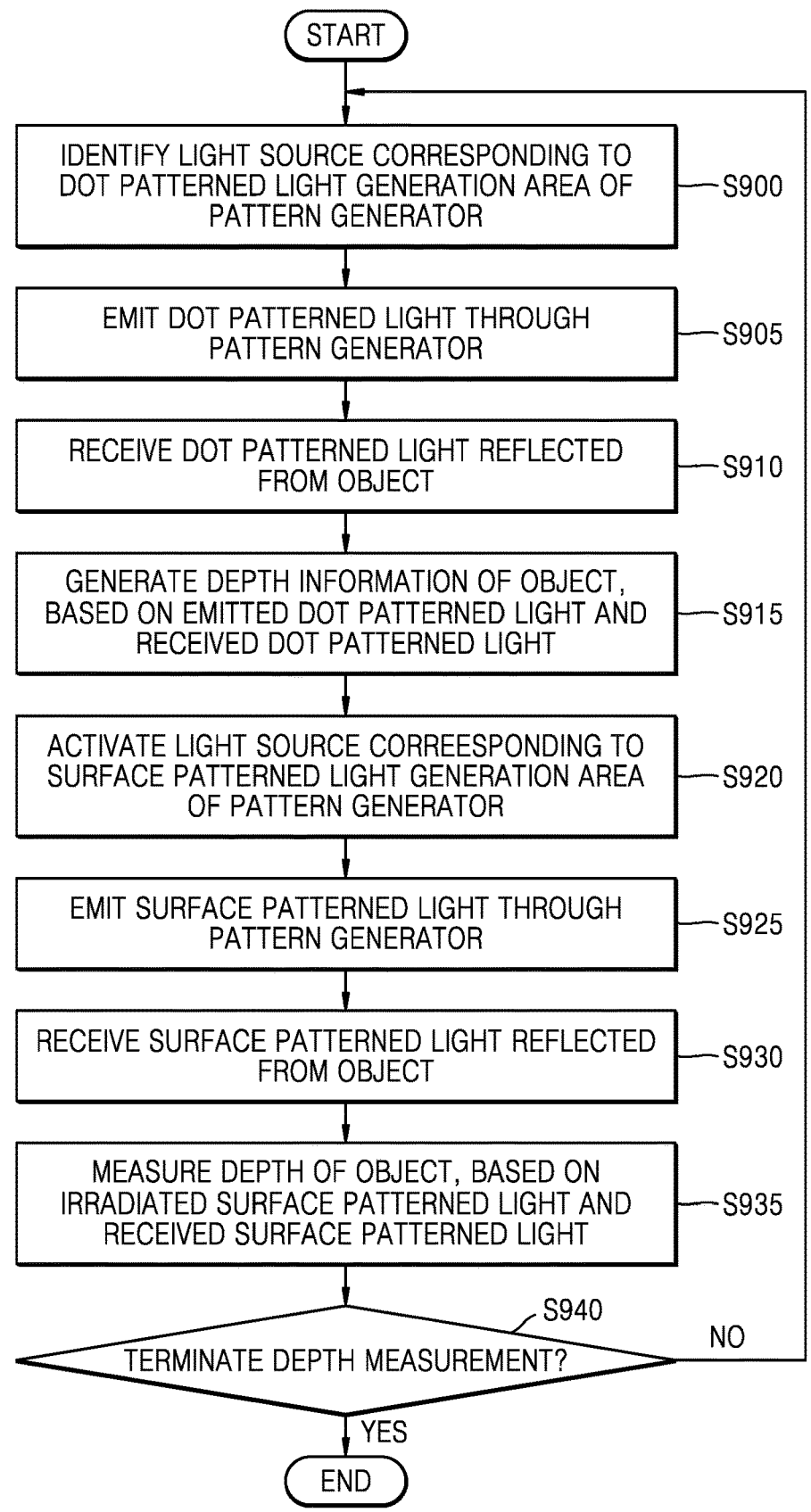
FIG. 9 is a flowchart of a method, performed by an AR device, for sequentially emitting dot-patterned light and surface-patterned light according to an embodiment.

FIG. 9 is a flowchart of a method, performed by the AR device 1000, for sequentially emitting dot-patterned light and surface-patterned light; according to an embodiment.

In FIG. 9, the AR device 1000 may sequentially emit dot-patterned light and surface-patterned light in order to scan the surroundings of the AR device 1000.

In operation S900, the AR device 1000 may identify a light source corresponding to a dot-patterned light generation area of the pattern generator 1520, and in operation S905, the AR device 1000 may emit dot-patterned light through the pattern generator 1520. The AR apparatus 1000 may activate the identified light source so that light is irradiated from the light source and passes through the dot-patterned light generation area of the pattern generator 1520. The dot-patterned light may be emitted from the dot-patterned light generation area to an object.

Also, in operation S910, the AR device 1000 may receive the dot-patterned light reflected from the object, and in operation S915, the AR device 1000 may generate depth information of the object based on the emitted dot-patterned light and the received dot-patterned light.

In operation S920, the AR device 1000 may identify a light source corresponding to a surface-patterned light generation area of the pattern generator 1520, and in operation S925, the AR device 1000 may emit surface-patterned light through the pattern generator 1520. The AR device 1000 may activate the identified light source so that light is irradiated from the light source and passes through the surface-patterned light generation area of the pattern generator 1520. The surface-patterned light may be emitted from the surface-patterned light generation area to an object.

Also, in operation S930, the AR device 1000 may receive the surface-patterned light reflected from the object, and in operation S935, the AR device 1000 may generate depth information of the object based on the emitted surface-patterned light and the received surface-patterned light.

In operation S940, the AR device 1000 may determine whether to terminate depth measurement. The AR device 1000 may measure depths of objects in the vicinity of the AR device 1000, and generate a depth map of the surroundings of the AR device 1000. When it is determined that the depth map is not sufficiently generated, the AR device 1000 may repeatedly perform operations S900 to S935. When it is determined that the depth map is sufficiently generated, the AR device 1000 may terminate depth measurement.

Figure 10:
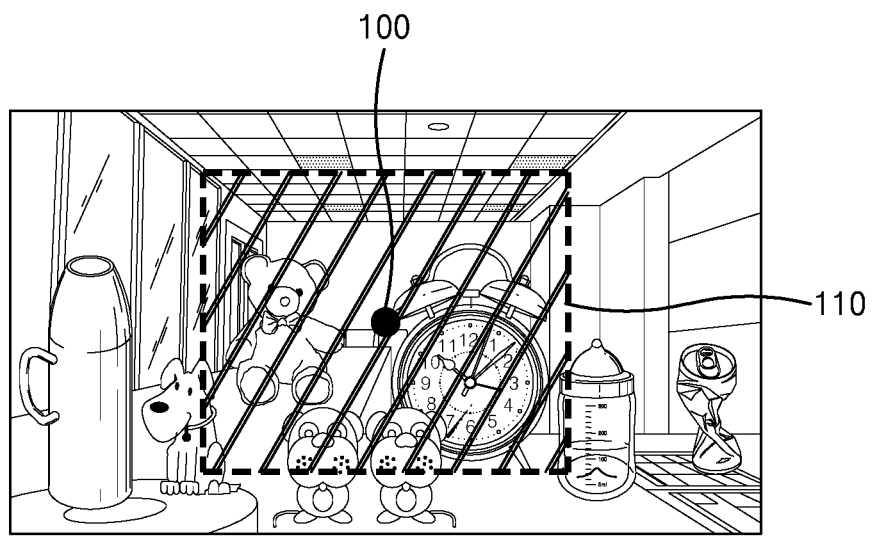
FIG. 10 is a diagram illustrating an example of emitting patterned light in a partial area in the vicinity of a point of gaze of a user according to an embodiment.

FIG. 10 is a diagram illustrating an example of emitting patterned light only in a partial area in the vicinity of a point of gaze of a user according to an embodiment.

Referring to FIG. 10, the AR device 1000 may identify a point of user's gaze 100, and may set, as a patterned light emission area 110, a partial area in the vicinity of the point of user's gaze 100 within an area in the vicinity of the AR device 1000. Also, patterned light may be emitted toward the set patterned light emission area 110 of the AR device 1000.

Figure 11:
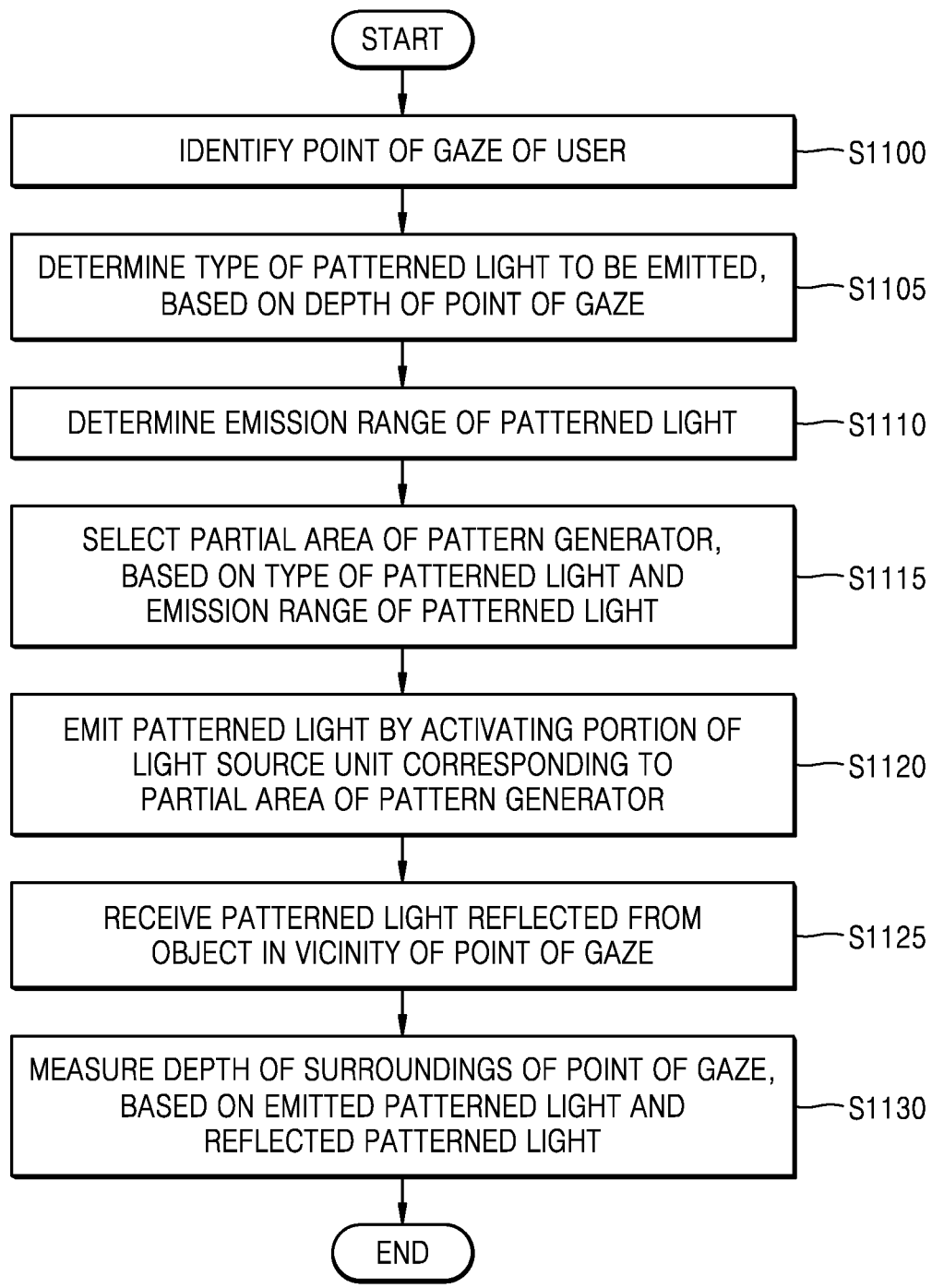
FIG. 11 is a flowchart of a method for emitting patterned light according to a depth of a point of gaze of a user; according to an embodiment.

FIG. 11 is a flowchart of a method for emitting patterned light according to a depth of a point of gaze of a user, according to an embodiment.

In operation S1100, the AR device 1000 may identify a point of gaze of a user. The AR device 1000 may identify the point of the gaze of the user by using the gaze tracking sensor 1600. The AR device 1000 may measure a depth of the point of the gaze of the user. For example, the AR device 1000 may calculate a depth of a point of gaze at which a user gazes based on positions of the user's pupils. Alternatively, for example, the AR device 1000 may also directly measure a depth of an object located at a point of gaze of a user. In this case, the AR device 1000 may irradiate light toward the object located at the point of the gaze of the user, and measure a depth of the point of the gaze by using the light reflected from the object.

In operation S1105, the AR device 1000 may determine a type of patterned light to be emitted based on a depth of the point of gaze. The AR device 1000 may determine to emit dot-patterned light when the depth of the point of gaze is greater than a certain threshold value. Also, the AR device 1000 may determine to emit surface-patterned light when the depth of the point of gaze is less than a certain threshold value. For example, a threshold value compared with a depth of a point of gaze may be a certain distance value in the vicinity of a user's body. Thus, the AR device 1000 may determine to emit surface-patterned light when it is determined that the user gazes the surroundings of the user's body. Also, the AR device 1000 may determine to emit dot-patterned light when it is determined that the user gazes at a zone far from the user.

In operation S1110, the AR device 1000 may determine an emission range of the patterned light. The AR device 1000 may determine to emit the patterned light only for a partial area within an entire area in the vicinity of the AR device 1000 according to a preset criterion. For example, the AR device 1000 may determine the emission range of the patterned light by considering a type of an application being executed and a function of the application. For example, in order to identify the user's gesture, the AR device 1000 may determine a partial area in the vicinity of the user's hand as an area onto which the patterned light is to be emitted. However, the disclosure is not limited thereto, and for example, the emission range of the patterned light may be determined according to various criteria such as a remaining battery amount of the AR device 1000, a battery consumption for measuring a depth, and an accuracy of a depth to be measured.

In operation S1115, the AR device 1000 may select a partial area of the pattern generator 1520 based on the type of the patterned light and the emission range of the patterned light. The AR device 1000 may determine through which area of the pattern generator 1520 the patterned light should be emitted based on the type of the patterned light and the emission range of the patterned light.

In operation S1120, the AR device 1000 may emit the patterned light by activating a partial area of the light source unit 1510 corresponding to the partial area of the pattern generator 1520. The AR device 1000 may activate the partial area of the light source unit 1510 that irradiates light to the partial area of the pattern generator 1520 selected in operation S1115, and the light irradiated from the partial area of the light source unit 1510 may pass through the partial area of the pattern generator 1520 selected in operation S1115. The patterned light that has passed through the partial area of the pattern generator 1520 may be emitted toward an object.

In operation S1125, the AR device 1000 may receive the patterned light reflected from the object in the vicinity of the point of gaze, and in operation S1130, the AR device 1000 may measure a depth of the surroundings of the point of gaze based on the emitted patterned light and the reflected patterned light.

Figure 12:
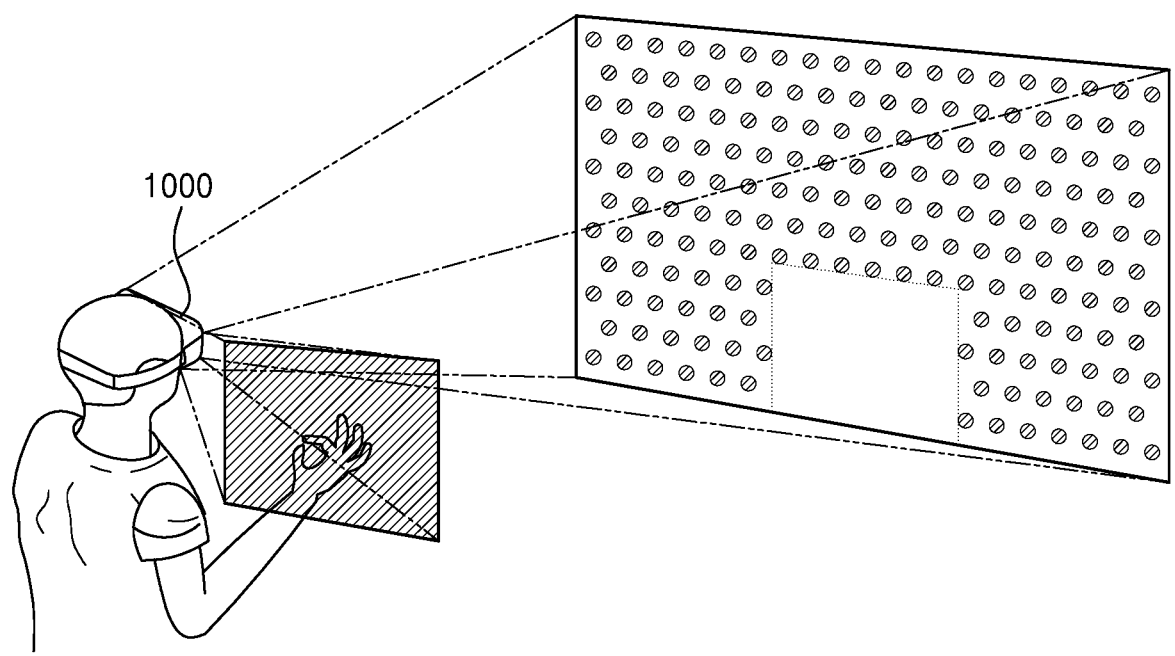
FIG. 12 is a diagram illustrating an example of emitting patterned light in response to a user's gesture being detected according to an embodiment.

FIG. 12 is a diagram illustrating an example of emitting patterned light in response to a user's gesture being detected according to an embodiment.

Referring to FIG. 12, the AR device 1000 may detect a gesture of a user's hand, emit surface-patterned light onto an area in the vicinity of (or corresponding to) the user's hand, and emit dot-patterned light onto the remaining area.

Figure 13:
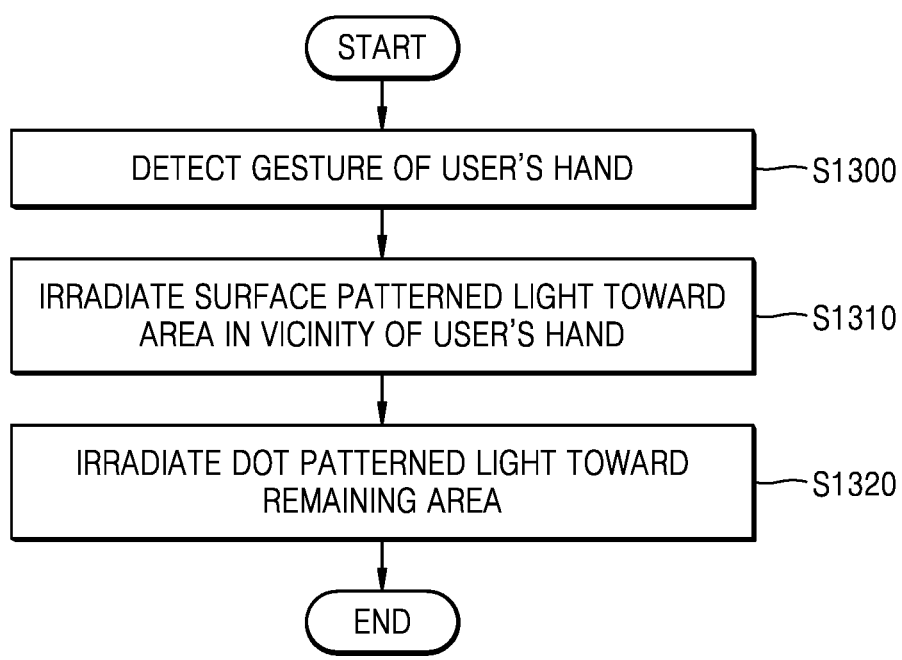
FIG. 13 is a flowchart of a method for emitting patterned light in response to a user's gesture being detected according to an embodiment.

FIG. 13 is a flowchart of a method for emitting patterned light in response to a user's gesture being detected according to an embodiment.

In operation S1300, the AR device 1000 may detect a gesture of a user's hand. The user may do a preset motion in order to input a gesture using a hand, and the AR device 1000 may detect the gesture of the user's hand. The AR device 1000 may monitor the surroundings of the AR device 1000 by emitting a small amount of patterned light, and may detect the user's motion for inputting the gesture.

In operation S1310, the AR device 1000 may emit surface-patterned light toward an area in the vicinity of (or corresponding to) the user's hand. The AR device 1000 may determine a certain area in the vicinity of the user' hand as an area onto which the surface-patterned light is to be emitted, and may emit the surface-patterned light onto the determined area. The AR device 1000 emits the surface-patterned light only onto the area in the vicinity of the user's hand, and thus, may effectively detect a gesture of the user's hand while reducing power consumption of the AR device 1000.

In operation S1320, the AR device 1000 may emit dot-patterned light toward the remaining area. The AR device 1000 may obtain depth information about the object in the vicinity of the user while detecting the gesture of the user's hand by emitting the dot-patterned light onto the remaining area other than the area in the vicinity of the user's hand in a real space.

Figure 14:
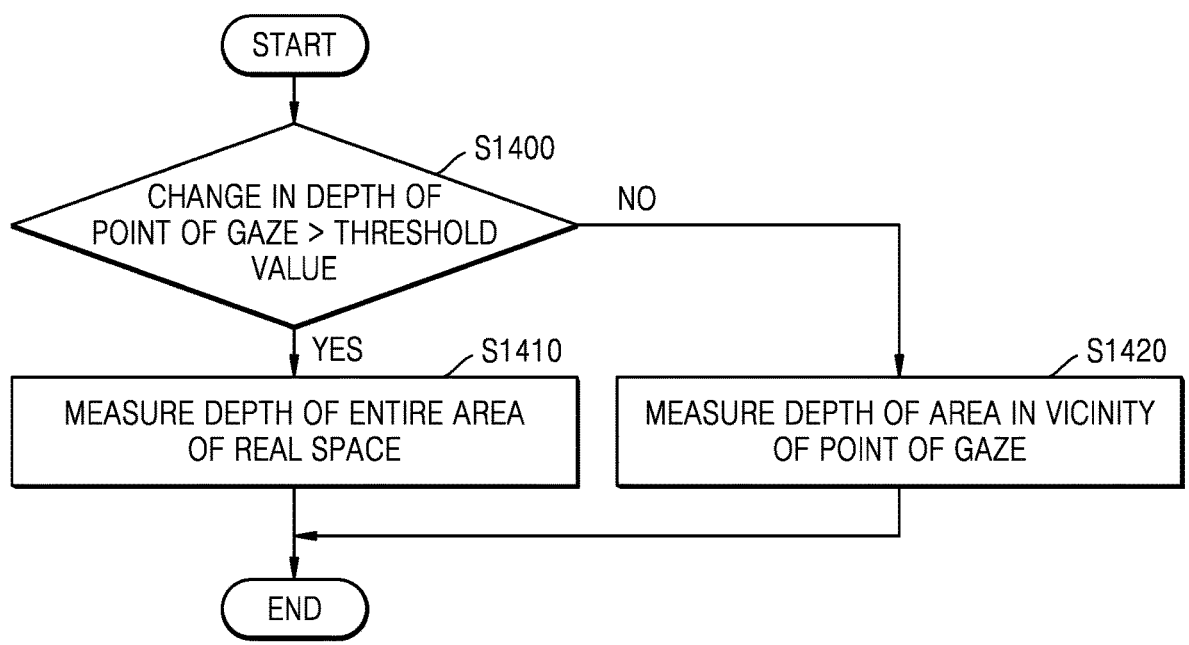
FIG. 14 is a flowchart of a method for measuring a depth of the surroundings of an AR device according to a change in a depth of a point of gaze according to an embodiment.

FIG. 14 is a flowchart of a method for measuring a depth of the surroundings of the AR device 1000 according to a change in a depth of a point of gaze, according to an embodiment.

In operation S1400, the AR device 1000 may determine whether a change in a depth of a point of gaze is greater than a certain threshold value. The AR device 1000 may monitor a change in a depth of a point of gaze of a user, and may determine whether the change in the depth of the point of the gaze of the user is greater than a certain threshold value.

When it is determined that the change in the depth of the point of gaze is greater than the certain threshold value, in operation S1410, the AR device 1000 may measure a depth of an entire area of a real space. When the change in the depth of the point of the gaze of the user is large, the user may be in a new environment, and thus, the AR device 1000 may measure a depth of an entire area of a real space in order to scan the surroundings of the AR device 1000. The AR device 1000 may emit dot-patterned light toward the surroundings of the AR device 1000, and may receive the dot-patterned light reflected from an object. Also, the AR device 1000 may measure a depth of the surroundings of the AR device 1000 by comparing the emitted dot-patterned light with the received dot-patterned light.

When it is determined that the change in the depth of the point of gaze is less than the certain threshold value, in operation S1420, the AR device 1000 may measure a depth of an area in the vicinity of the point of gaze. When the change in the depth of the point of the gaze of the user is small, the user may be in a new environment, and the AR device 1000 may measure only a depth of an area in the vicinity of the point of the gaze.

An embodiment of the disclosure may be implemented in the form of a recording medium including instructions, which are capable of being executed by a computer, such as a program module executed by the computer. A computer-readable recording medium may be any available medium accessible by a computer and may include volatile and non-volatile media and separable and non-separable media. In addition, the computer-readable recording medium may include a computer storage medium and a communication medium. The computer storage medium includes volatile and non-volatile media and separable and non-separable media, which are implemented by any method or technique for storing information such as computer-readable instructions, data structures, program modules, or other data. The communication medium may typically include computer-readable instructions, data structures, or other data in a modulated data signal such as program modules.

Also, a computer-readable storage medium may be provided in the form of a non-transitory storage medium. Here, the term "non-transitory storage medium" only means that it is a tangible device and does not include signals (e.g., electromagnetic waves), and the term does not distinguish between a case where data is stored semi-permanently in a storage medium and a case where data is temporarily stored. For example, the "non-transitory storage medium" may include a buffer in which data is temporarily stored.

According to an embodiment of the disclosure, methods according to various embodiments disclosed herein may be provided while included in a computer program product. The computer program product may be traded as merchandise between a seller and a purchaser. The computer program product may be distributed in the form of a device-readable storage medium (e.g., a compact disc read only memory (CD-ROM)), or may be distributed (e.g., downloaded or uploaded) online via an application store (e.g., Play Store™) or between two user devices (e.g., smartphones) directly. When distributed online, at least part of the computer program product (e.g., a downloadable application) may be temporarily generated or at least temporarily stored in a device-readable storage medium, such as a memory of a manufacturer's server, a server of an application store, or a relay server.

In addition, the term such as " . . . unit" or " . . . portion" used herein may refer to a hardware component such as a processor or a circuit, and/or a software component executed by the hardware component such as a processor.

An expression "including at least one of a, b, or c" used herein means "including only a", "including only b", "including only c", "including a and b", "including b and c", "including a and c", or "including both a, b and c".

It will be understood by one of ordinary skill in the art that the embodiments of the disclosure are provide for illustration and may be implemented in different ways without departing from the spirit and scope of the disclosure. Therefore, it should be understood that the foregoing embodiments of the disclosure are provided for illustrative purposes only and are not to be construed in any way as limiting the disclosure. For example, each component described as a single type may be implemented in a distributed manner, and likewise, components described as being distributed may be implemented as a combined type.

The scope of the disclosure should be defined by the appended claims and equivalent thereof, and any changes or modifications derived from the appended claims and equivalents thereof should be construed as falling within the scope of the disclosure.

The invention claimed is:

1. A method, by an augmented reality (AR) device, of measuring a depth of an object, the method comprising:
    determining, from among a dot-pattern and a surface-pattern, a pattern of light to be emitted for measuring the depth of the object;
    identifying, from within an entire area of a pattern generator, a partial area of a light source unit corresponding to an area for the determined pattern;
    emitting light through the area for the determined pattern, by activating the identified partial area of the light source unit;
    receiving light reflected from the object; and
    measuring the depth of the object based on the emitted light and the received reflected light.

2. The method of claim 1, wherein the area for the determined pattern comprises a first area for changing the light irradiated from the light source unit to the dot-patterned light or a second area for changing the light irradiated from the light source unit to the surface-patterned light.

3. The method of claim 2, wherein the first area comprises a plurality of first sub-areas, and
    wherein the plurality of first sub-areas respectively correspond to a plurality of real areas of a real space.

4. The method of claim 3, further comprising:
    identifying a position of the object in the real space; and
    identifying, from the plurality of first sub-areas, at least one first sub-area corresponding to the position of the object,
    wherein light is emitted through the identified at least one first sub-area by activating a partial area of the light source unit corresponding to the identified at least one first sub-area.

5. The method of claim 1, further comprising:
    identifying a point of gaze of a user of the AR device; and
    identifying a depth of the point of gaze,
    wherein the determining of the pattern comprises selecting based on the depth of the point of gaze, the dot-pattern or the surface-pattern.

6. The method of claim 5, further comprising:
    identifying a variation in the depth of the point of gaze; and
    based on the identified variation in the depth of the point of gaze, determining whether to sequentially emit the light of the dot-patter and the light of the surface-pattern through the pattern generator.

7. The method of claim 5, further comprising based on a position of the point of gaze, determining, from within an entire area of a real space, a certain area corresponding to the point of gaze,
    wherein the light is emitted through an area of the pattern generator corresponding to the determined certain area.

8. The method of claim 1, further comprising:
    detecting a gesture of a user's hand;
    determining to emit the light of the surface-pattern onto an area corresponding to the user's hand within a real space; and
    determining to emit the light of the dot-pattern onto a remaining area within the real space, the remaining area being an area within the real space that does not correspond to the user's hand.

9. The method of claim 1, wherein the light irradiated from the light source unit of the AR device toward the pattern generator is changed to a light of a pattern through the pattern generator.

10. The method of claim 1, wherein the pattern generator comprises at least one of a diffractive optical element (DOE) or a liquid crystal (LC) lens array.

11. An augmented reality (AR) device for measuring a depth of an object, the AR device comprising:
    a light source unit configured to irradiate light for depth measurement;

a pattern generator configured to change the irradiated light to patterned light;

a light receiver configured to receive light reflected from an object in a vicinity of the AR device;

a memory storing instructions; and a processor configured to execute the instructions to:

determine, from among a dot-pattern and a surface-pattern, a pattern of light to be emitted for measuring the depth of the object, identify, from within an entire area of the pattern generator, a partial area of the light source unit corresponding to an area for the determined pattern, emit light through the area for the determined pattern, by activating the identified partial area of the light source unit, receive, through the light receiver, light reflected from the object, and measure the depth of the object based on the emitted light and the received reflected light.

12. The AR device of claim 11, wherein the pattern generator comprises a first area for changing the light irradiated from the light source unit to light of the dot-pattern and a second area for changing the light irradiated from the light source unit to light of the surface-pattern.

13. The AR device of claim 12, wherein the first area comprises a plurality of first sub-areas, and the plurality of first sub-areas respectively correspond to a plurality of real areas of a real space.

14. The AR device of claim 13, wherein the processor is further configured to execute the instructions to identify a position of the object in the real space, and identify, from the plurality of first sub-areas, at least one first sub-area corresponding to the position of the object, and wherein the light is emitted through the identified at least one first sub-area by activating a partial area of the light source unit corresponding to the identified at least one first sub-area.

15. A non-transitory computer-readable recording medium having recorded thereon a program for executing the method of claim 1 on a computer.

* * * * *